(12) United States Patent
Neter et al.

(10) Patent No.: US 8,696,347 B2
(45) Date of Patent: Apr. 15, 2014

(54) SYSTEM FOR POST-TREATING AND TRANSFERRING PREFORMS

(75) Inventors: Witold Neter, Newnan, GA (US); Helmut Thoemmes, Kastel-Staadt (DE); Rainer Petry, Klein-Winternheim (DE); Christian Wagner, Mainz (DE)

(73) Assignee: MHT Mold & Hotrunner Technology AG, Hochheim (DE)

( * ) Notice: Subject to any disclaimer, the term of this patent is extended or adjusted under 35 U.S.C. 154(b) by 224 days.

(21) Appl. No.: 13/133,262

(22) PCT Filed: Dec. 12, 2008

(86) PCT No.: PCT/EP2008/067470
§ 371 (c)(1), (2), (4) Date: Aug. 29, 2011

(87) PCT Pub. No.: WO2010/066308
PCT Pub. Date: Jun. 17, 2010

(65) Prior Publication Data
US 2011/0305789 A1 Dec. 15, 2011

(51) Int. Cl.
*B29B 11/08* (2006.01)

(52) U.S. Cl.
USPC ........................................ 425/547

(58) Field of Classification Search
USPC .......................................... 425/547
See application file for complete search history.

(56) References Cited

U.S. PATENT DOCUMENTS 4,592,719 A 6/1986 Bellehache et al.
6,299,431 B1 * 10/2001 Neter ............................ 425/526

FOREIGN PATENT DOCUMENTS

WO 2004041510 A1 5/2004

* cited by examiner

*Primary Examiner* — Yogendra Gupta
*Assistant Examiner* — Robert J Grun
(74) *Attorney, Agent, or Firm* — Michael L. Dunn

(57) ABSTRACT

A system for the post-treatment of preforms (9) produced by means of injection moulding, including a removal element (4) having at least one receiving element (5) for receiving a preform (9), and a device for moving the removal element (4) between two tool halves of an opened injection moulding mould and for moving the removal element (4) out of the opened injection moulding mould, a post-treatment element (6) having at least one post-treatment pin (7) having a pin-shaped passage element (7), of which one end can be connected to the environment or a vacuum or reduced-pressure source and of which the other end has an outlet (18) for a coolant, and a motion device with which the removal element (4) can be reciprocated relative to the post-treatment element (6) between a first position in which the post-treatment pin (7) is positioned within the receiving element (5) and a second position in which the post-treatment pin (7) is not positioned within the receiving element (5), wherein the removal element (4) and the post-treatment element (6) are so designed that in the first position coolant can be introduced by way of the coolant inlet into a preform held in the receiving element (5) in such a way that it can flow between the inside wall of the preform (9) and the outside wall of the pin-shaped passage element (7) to the coolant outlet (18) and can be discharged by way of the passage element (7).

13 Claims, 17 Drawing Sheets

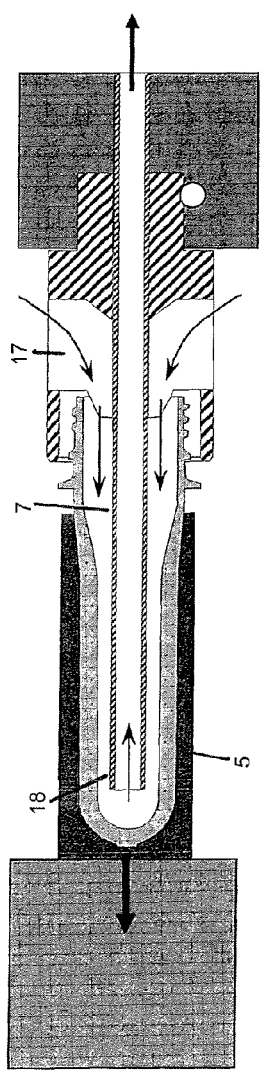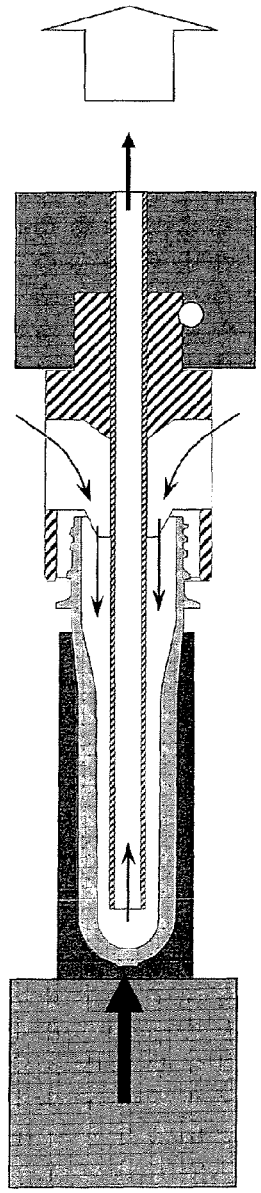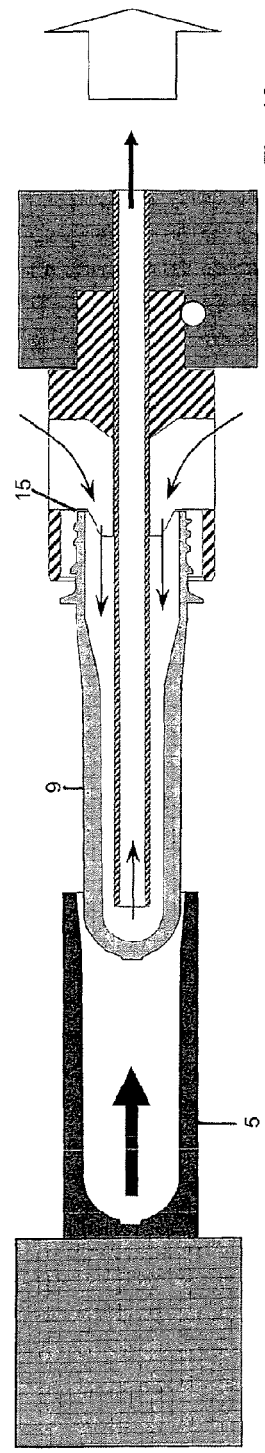

SYSTEM FOR POST-TREATING AND TRANSFERRING PREFORMS

BACKGOUND OF THE INVENTION

The present invention concerns a system for post-treatment of preforms produced by means of injection moulding.

By way of example commercially available PET bottles are generally produced by stretch blow moulding of the hollow body preform. In that case the hollow body preform is produced in a first step by injection moulding. The stretch blow moulding operation which follows the injection moulding operation can be effected either immediately after production of the hollow body preform or at a later time. In the production of the corresponding injection moulding moulds, a high level of complication and expenditure is necessary as the injection moulding mould on the one hand has to be designed for very high pressures and on the other hand it must also have suitable heated and/or cooled passages.

Usually an injection moulding tool for the production of PET preforms comprises a large number of, for example 96, cavities into which tool cores of a corresponding configuration are introduced. When the tool is closed, that is to say when the core is fitted into the corresponding cavity, a space, the so-called mould space, is formed between the core on the one hand and the cavity on the other hand. The plasticised plastic material, for example PET, is then injected into that space under high pressure. As soon as the PET preform has cooled sufficiently the mould can be opened and the preform removed.

To reduce the cycle times, that is to say the time from one injection operation to the next, it is already usual for the preform to be removed from the mould at a very early time at which the preform is already solid at its outside surfaces, but the inner region thereof is still fluid. In that condition the preform is generally transferred on to a receiving element, frequently a so-called receiving plate, which generally comprises a group of receiving cavities, wherein each receiving cavity can receive a preform. Thus for example in the so-called vertical tools, that is to say those injection moulding tools which open by a vertical movement of the one tool portion relative to the other, it is possible for the tool mould to be already opened after for example 10 seconds, for a receiving plate with suitable receiving cavities to be introduced into the mould, for the individual preforms to be allowed to fall into the receiving cavities under the force of gravity, for the receiving plate with the preforms to be moved out of the tool and for the mould to close again and begin the next injection moulding operation. During the next injection moulding operation the previous preforms remain in the receiving cavity which is usually cooled.

The receiving plate thus functions as a removal element which has individual receiving elements for receiving a preform and a device for moving the removal element between two mould halves of an opened injection moulding mould and for moving the removal element out of the opened injection moulding mould.

As the preform must remain in the receiving cavity for a comparatively long time for cooling so that generally the next preform can already be removed from the injection moulding tool before the preform has cooled down in the receiving cavity to such an extent that it can be removed without the risk of damage it is already usual to employ receiving plates which have a plurality of groups of receiving cavities, wherein each group has as many receiving cavities as the injection moulding tool provides preforms per injection cycle. The individual receiving cavity groups are then successively equipped with preforms so that the individual preform can remain in the receiving cavity for longer than an injection moulding cycle.

To further reduce the post-treatment time in the removal plate, it has already been proposed in U.S. Pat. No 6,475,422 that a pin be introduced into the preform, by way of the tip of which cooling fluid is passed into the bottom region of the preform. In that case the cooling fluid issues at the tip of the pin and then flows through the annular gap formed between the cooling pin and the inside wall of the preform, and out of the preform into the environment. The preform is thus cooled not only from the exterior but also from the interior.

In that embodiment however a considerable amount of cooling fluid has to be supplied under relatively high pressure by way of the cooling pin to ensure that sufficient cooling fluid flows through the annular gap and carries away sufficient heat. To provide sufficient cooling fluid it is necessary to act on the cooling pin with compressed air, which involves the costly provision of suitable air feed lines and suitable compressors. In addition that kind of cooling fluid feed leads to very rapid cooling of the bottom portion of the preform while the wall portions and in particular the neck portions are only relatively slowly cooled down, which leads to large temperature differences within the preform, whereby the quality of the preform can be impaired.

WO 2007/063063 has therefore already proposed that the post-treatment pin should be porous so that the cooling fluid is supplied not only by way of the tip but also along the entire peripheral surface of the cooling pin. The temperature difference within the preform can be markedly reduced by that measure. Porous post-treatment pins however are relatively complicated and expensive to manufacture and have to be supplied with high pressure to ensure an adequate coolant fluid flow.

BRIEF SUMMARY OF THE INVENTION

In accordance with the invention, a system is provided for the post-treatment of preforms (9) produced by means of injection moulding, including
i) a removal element (4) having:
   a) at least one receiving element (5) for receiving a preform (9), and
   b) a device for moving the removal element (4) between two tool halves of an opened injection moulding mould and for moving the removal element (4) out of the opened injection moulding mould,
ii) a post-treatment element (6) having
   a) at least one post-treatment pin (7)
   a1) having a pin-shaped passage element (7),
      a11) of which one end can be connected to the environment or a vacuum or reduced-pressure source and
      a12) of which the other end has an outlet (18) for a coolant, and
iii) a motion device with which the removal element (4) can be reciprocated relative to the post-treatment element (6) between a first position in which the post-treatment pin (7) is positioned within the receiving element (5) and a second position in which the post-treatment pin (7) is not positioned within the receiving element (5), wherein the removal element (4) and the post-treatment element (6) are so designed that in the first position coolant can be introduced by way of the coolant inlet into a preform (9) held in the receiving element (5) in such a way that it can flow between the inside wall of the preform (9) and the outside wall of the pin-shaped passage element (7) to the coolant outlet (18) and can be discharged by way of the passage element (7).

BRIEF DESCRIPTION OF THE SEVERAL VIEWS OF THE DRAWINGS

FIGS. 10 to 12 show various diagrammatic views of the FIG. 9 embodiment.

DETAILED DESCRIPTION OF THE INVENTION

Figure 1:
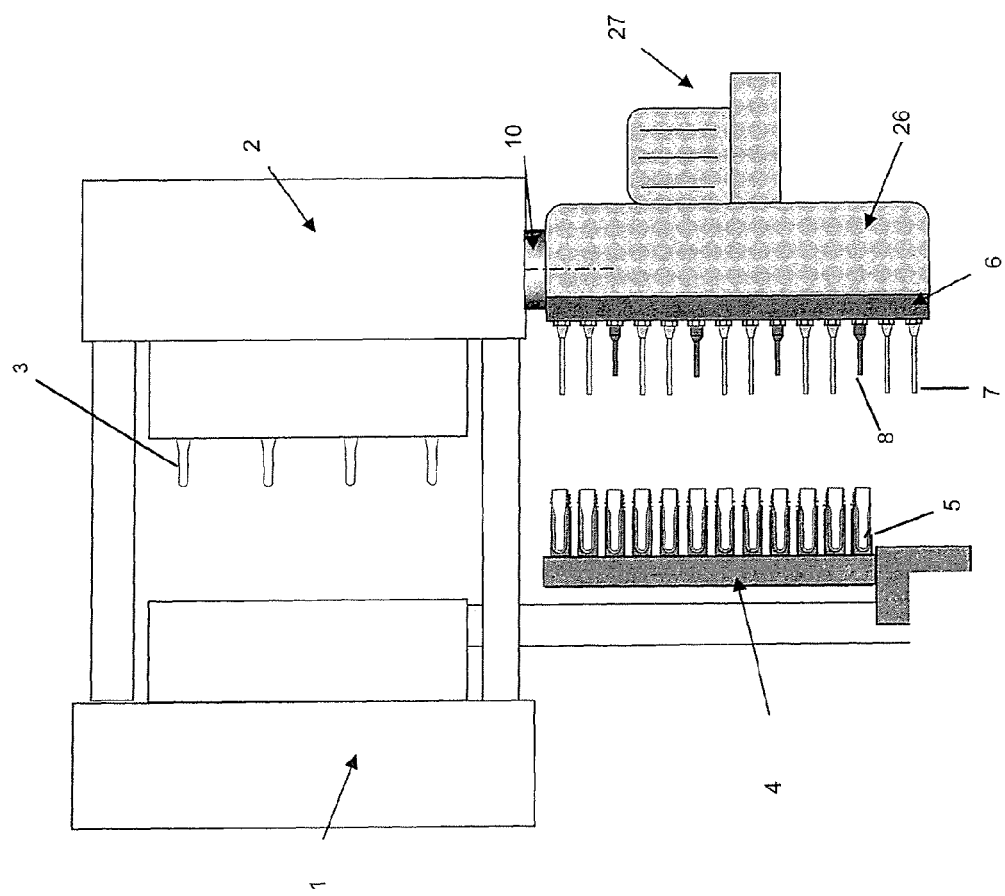
FIG. 1 shows a diagrammatic view of a PET injection moulding system with post-treatment unit.

Based on the described state of the art therefore the object of the present invention is to provide a system for the pre-treatment of preforms produced by injection moulding, which can be operated inexpensively without the provision of compressed air and minimises the temperature gradient within the preform, which inevitably occurs during the post-treatment.

According to the invention that object is attained by a corresponding system comprising a removal element having at least one receiving element for receiving a preform, and a device for moving the removal element between two tool halves of an opened injection moulding mould and for moving the removal element out of the opened injection moulding mould, a post-treatment element having at least one post-treatment pin having a pin-shaped passage element, of which one end can be connected to the environment or a vacuum or reduced-pressure source and of which the other end has an outlet for a coolant, and a motion device with which the removal element can be reciprocated relative to the post-treatment element between a first position in which the post-treatment pin is positioned within the receiving element and a second position in which the post-treatment pin is not positioned within the receiving element, wherein the removal element and the post-treatment element are so designed that in the first position coolant can be introduced by way of the coolant inlet into a preform held in the receiving element in such a way that it can flow between the inside wall of the preform and the outside wall of the pin-shaped passage element to the coolant outlet and can be discharged by way of the passage element. The tip of the pin-shaped passage element thus functions as a coolant outlet, by way of which the coolant introduced into the preform can be discharged from the preform.

The direction of the coolant flow is thus reversed in relation to the configurations referred to in the opening part of this specification. Basically the post-treatment element does not have to make any cooling fluid available as the pin-shaped passage element can be connected to a vacuum or reduced-pressure source and then the cooling fluid can simply be sucked in out of the environment.

If in contrast the pin-shaped passage element is only connected to ambient pressure the post-treatment element should have a feed for coolant.

Thus the post-treatment element can have for example a coolant inlet arranged outside the pin-shaped passage element, wherein the coolant inlet is preferably in the form of a sleeve surrounding the pin-shaped passage element so that the coolant can be fed by way of a preferably annular gap formed between the pin-shaped passage element and the sleeve. While the coolant outlet serves for discharge of the cooling fluid out of the preform the coolant inlet serves for introducing the coolant into the preform.

In a particularly preferred embodiment there is provided a flow machine, for example a ventilator or a fan, which at the coolant inlet provides a cooling fluid pressure of between 1 and 3 bars, preferably between 1 and 1.5 bars and best between 1 and 1.2 bars. Uniform post-treatment of the preform is possible with such a low pressure, in addition it is possible to dispense with a compressed air connection as usual flow machines such as for example fans or ventilators are capable of providing the corresponding cooling fluid pressure. By virtue of the cooling fluid direction according to the invention it is possible to dispense with the complicated and expensive provision of compressed air. The use of a flow machine also has the advantage that this involves more uniform cooling of the preform.

Alternatively or in combination there can be provided a flow machine which at the coolant outlet produces a cooling fluid pressure of less than 1 bar, preferably between 0.8 and 1 bar and particularly preferably between 0.9 and 0.99 bar.

In a further particularly preferred embodiment the post-treatment element has at least one transfer element with which a preform can be transferred from the removal element to the post-treatment element.

Such a transfer may be required if the preform is to be taken from the removal element so that a further preform of the following injection moulding cycle can be received in that post-treatment element.

In addition the transfer element can have a transfer sleeve, wherein the transfer sleeve has a through passage, the first end of which can be connected to a vacuum source and the second end of which ends in the first position within a preform received in the receiving element, wherein the second end is preferably arranged at the peripheral surface of the sleeve. The sleeve shape permits simple transfer of the sleeve from the removal element to the post-treatment element, such transfer at the same time handling the preform gently.

In addition the transfer element can have a compressed air connection, by way of which compressed air can be introduced into the preform received in the receiving element to eject the preform from the transfer element. In other words the transfer element only serves to remove the preforms from the post-treatment element. Prolonged residence of the preform on or in the transfer element is not planned.

Basically any fluid can be considered as the coolant, even if gaseous coolants and in particular air are particularly preferred.

In a further preferred embodiment the post-treatment element has a coolant distributor plate including a plurality of post-treatment pins. That has the advantage that a plurality of post-treatment pins can be supplied with coolant with a single coolant distributor plate.

Advantageously the coolant distributor plate can be rotated about an axis of rotation to eject preforms which were transferred from the removal element on to the coolant distributor plate, wherein preferably the coolant distributor plate can be rotated through about 90°.

It is particularly desirable if the flow machine is arranged within or fixed to the coolant distributor plate, wherein the intake of the flow machine is connected to the coolant outlet of the at least one post-treatment pin while the outlet of the flow machine is connected to a coolant distributor plate opening relative to the environment, wherein the coolant distributor plate opening is preferably arranged at the side of the coolant distributor plate, that is opposite to the post-treatment pins. For example the coolant distributor plate can have a pressure chamber to which the fan is connected.

Alternatively thereto the outlet of the flow machine can be connected to the coolant inlet of the at least one post-treatment pin while the intake is connected to the coolant distributor plate opening relative to the environment.

For many situations of use it may be advantageous if the sleeve in the form of the coolant inlet has an outer periphery which approximately corresponds to the inner wall opening of the preform so that, in the first position, the outside of the coolant inlet sleeve is in contact with the inside of the preform.

In a further preferred embodiment the coolant distributor plate has cooling passages for the feed of a coolant for cooling the coolant distributor plate itself. In that case water is preferably used here for cooling the coolant distributor plate. Cooling of the coolant distributor plate provides on the one hand that the sleeve which in some embodiments comes directly into contact with the preform is cooled, for example to less than 10° C., and on the other hand the air fed into the preform is cooled.

In a further preferred embodiment there is provided a closure cap which can be fitted on to the passage element and/or the coolant inlet to close same.

In principle in operation of a PET injection moulding system it can happen that one (or more) of the mould cavities can no longer be operated for some reasons. Thus a tool having 96 mould space cavities for each injection moulding cycle could then only still produce 95 preforms per cycle. A mould space then simply remains empty. To prevent in the post-treatment operation coolant and/or vacuum or reduced pressure being unnecessarily discharged by way of a post-treatment element and/or a transfer element into a receiving element which is not carrying any preform, the closure cap can be used.

Further advantages, features and possible uses of the present invention will be clearly apparent from the description hereinafter of preferred embodiments and the associated Figures in which:

FIG. 1 shows a diagrammatic view of a PET injection moulding system with post-treatment unit. The injection moulding mould comprises two plates 1, 2 movable relative to each other, wherein one plate 1 is stationary and one plate 2 is movable in the illustrated embodiment.

The one plate has cores 3 while the other plate has corresponding cavities (not shown). The two plates can be moved relative to each other from an opened position shown in FIG. 1 into a closed position in which the cores 3 of the movable plate 2 are arranged in the corresponding cavities of the stationary plate 1. The so-called mould space which is filled with plasticised PET to form a preform is then formed between the cavities of the stationary plate 1 and the cores 3 of the movable plate 2.

As soon as the outer surfaces of the preform have cooled, that is to say become solid, the mould is opened and a removal element 4 in the form of plates is moved between the opened plates 1, 2. The preforms sitting on the cores 3 of the moving plate are then transferred into corresponding receiving elements also in the form of cavities.

In the illustrated example the injection moulding tool has four cores, that is to say four preforms are produced in the injection moulding cycle. The corresponding removal element 4 has however 12 (3×4) receiving elements 5 which can each receive a respective preform. The removal element 4 thus has three groups of receiving cavities which are successively filled with corresponding preforms. As soon as the preforms have been transferred from the cores 3 on to the receiving elements 5 of the removal element 4 the removal element 4 is moved again into the FIG. 1 position and the injection moulding mould comprising the two plates 1, 2 can be closed again. As in the illustrated embodiment the removal element is connected to the stationary plate 1 the post-treatment element 6 connected to the moving plate 2 moves towards the removal element 4. The post-treatment element 6 has a row of post-treatment pins 7 which, while the mould is closed, engage into the preforms held in the removal element 1.

Figure 2:
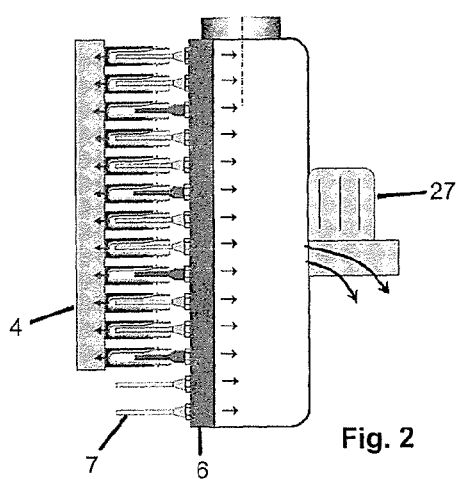
FIG. 2 shows a detail view of the post-treatment unit.

That situation is shown in FIG. 2.

The individual post-treatment pins are mounted on a pin plate. In addition transfer elements 8 are fixed to the pin plate which serve for transfer of the post-treated preforms from the removal plate 4 on to the transfer elements 8 or the post-treatment element 6. Fixed to the post-treatment element 6 is a fan 27 with which an increased pressure or a reduced pressure can be produced in a pressure chamber 26. The entire post-treatment plate 6 is adapted to be rotatable about the shaft 9 so that the post-treatment element can be rotated through 90° so that the preforms sitting on the transfer element 8 can be discharged under the force of gravity.

As can be seen from FIG. 2 air is evacuated both by way of the removal element 4 and also by way of the post-treatment element 6, out of the post-treatment space formed by the receiving element 5 on the one hand and the post-treatment pin 7 or transfer element 8 on the other hand. The former leads to the preforms being securely held in the receiving elements 5.

Furthermore it will be seen from FIGS. 1 and 2 that the post-treatment element 6 has more pins than the removal plate 4 has receiving cavities. The removal plate can therefore be positioned in a plurality of different positions (in the illustrated example 3) relative to the post-treatment element 6. The corresponding positions are assumed successively after a respective new set of preforms has been removed from the injection moulding mould so that the preform set held longest in the removal plate 4 is respectively positioned with respect to the transfer elements 8 and can therefore be removed.

Figure 3:
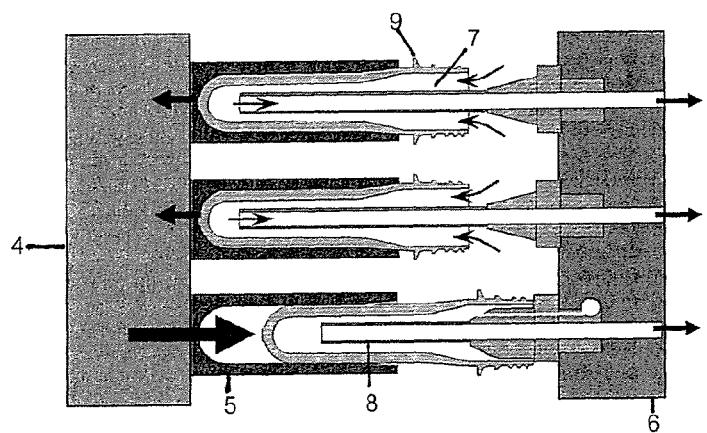
FIGS. 3 to 6 show various diagrammatic views of a first embodiment of the invention.

FIG. 3 shows a view on an enlarged scale. Shown therein are three receiving elements 5 fastened to the removal element 4. Two post-treatment pins 7 and a transfer element 8 are fastened to the post-treatment element 6 in opposite relationship. The post-treatment elements have a pin in the form of a sleeve, one end of which is connected to a vacuum or reduced-pressure source. The fan 7 is used for that purpose in the illustrated embodiment. That provides that, at the end remote from the post-treatment element 6 of the sleeve, cooling air is discharged from the interior of the preform 9. The tip of the pin-shaped passage element thus serves as a coolant outlet while coolant flows into the preform from the environment at the open side of the preform. The illustrated embodiment provides for a continuous air flow through the interior of the preform, wherein the air flows through the annular gap between the pin-shaped passage element and the inside of the preform 9 into the bottom region of the preform and leaves same through the coolant outlet at the tip of the pin-shaped passage element 7.

Figure 4:
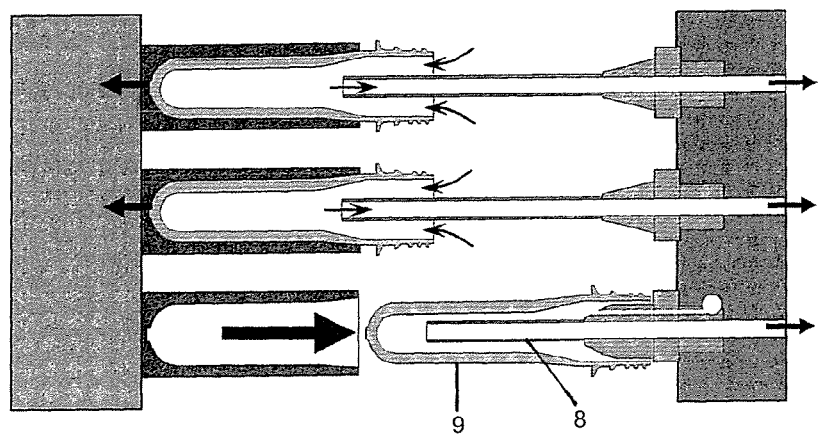
Figure 5:
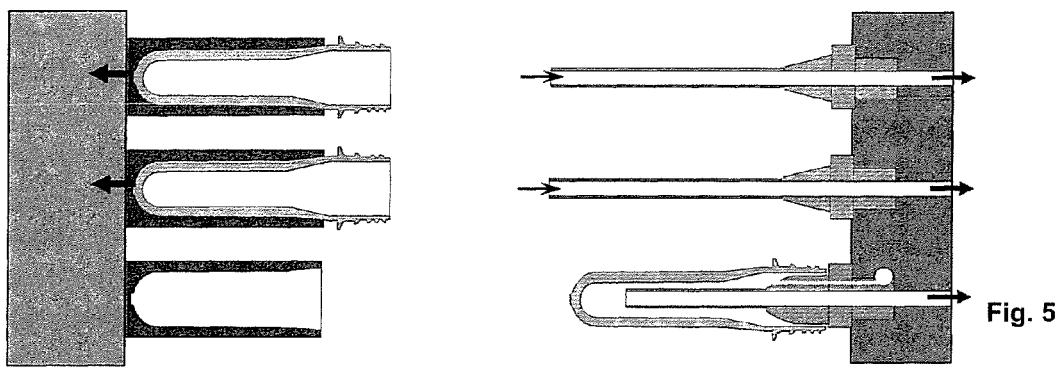

To remove the completely post-treated preform, that is to say which has also been cooled in its interior, from the receiving element 5 the corresponding receiving element is acted upon with increased pressure so that the preform 9 sitting in the corresponding receiving element 5 is transferred on to the transfer element 8. When the injection moulding tool is opened again, whereby the post-treatment unit consisting of the removal element 4 and the post-treatment element 6 is also opened again, the corresponding preform 9 remains on the transfer element 8 while the preforms in opposite relationship to the post-treatment pins remain in the corresponding receiving elements. That situation is shown in FIGS. 4 and 5.

Figure 6:
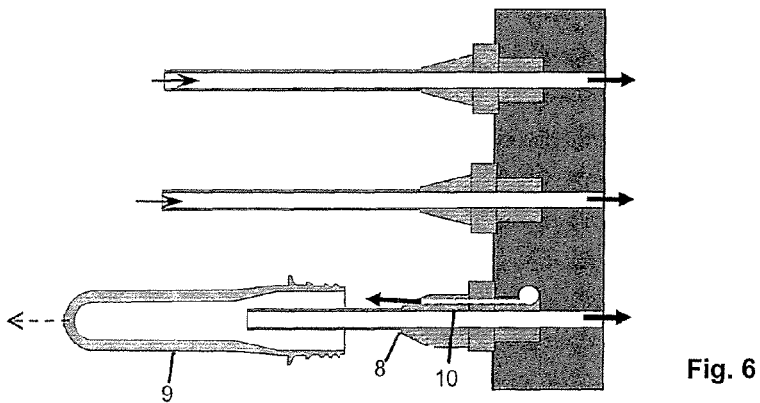

For definitive removal of the preform 9 carried on the transfer element 8 there is a compressed air feed shown in FIG. 6, which provides that the preform is ejected from the transfer element 8 at the correct time.

Figure 7:
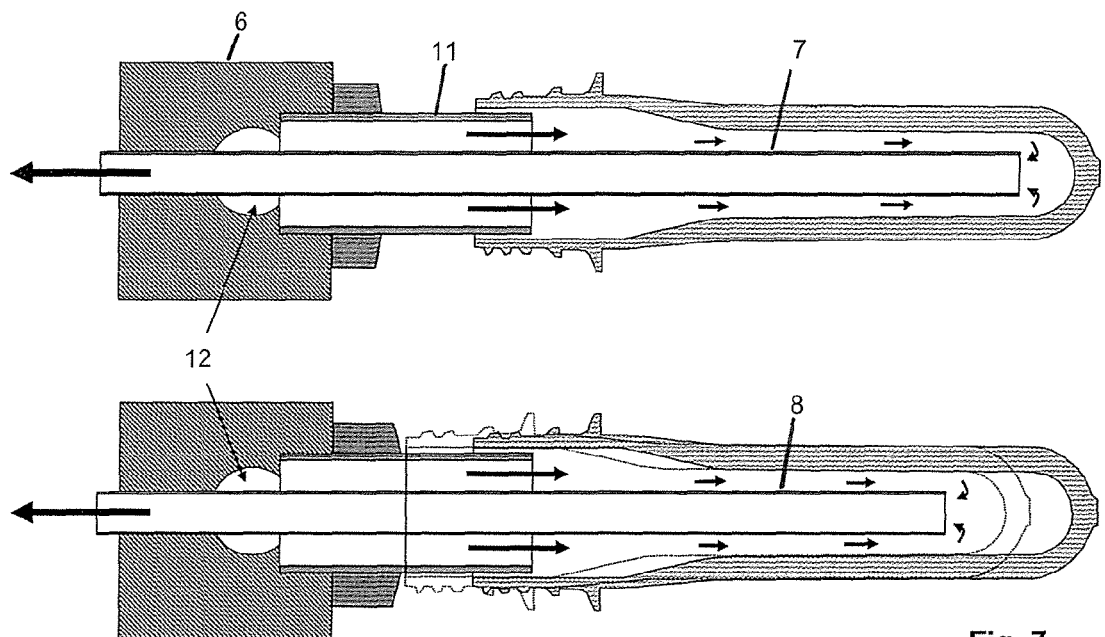
FIG. 7 shows a second embodiment of the invention.

FIG. 7 shows an alternative embodiment of the post-treatment pin. Here the post-treatment pin also comprises a pin-shaped passage element 7 which however is surrounded concentrically by a sleeve at its end towards the pin plate 6. Air is passed into the interior of the preform by way of that sleeve 11, by way of a corresponding supply passage 12. The sleeve 11 thus serves as a coolant inlet while the tip of the pin-shaped passage element again functions as a coolant outlet. FIG. 7 in the lower view again shows a corresponding transfer element 8 which is substantially like the post-treatment element 7, wherein only the pin-shaped passage element is somewhat shorter so that the preform 9 can be moved into the transfer position which is also shown at the bottom in FIG. 7 without the tip of the pin-shaped passage element encountering the bottom of the preform. In the embodiment illustrated here the transfer element performs a double function as it serves both for transfer of the preform and also for the post-treatment, that is to say the corresponding feed of air.

Figure 8:
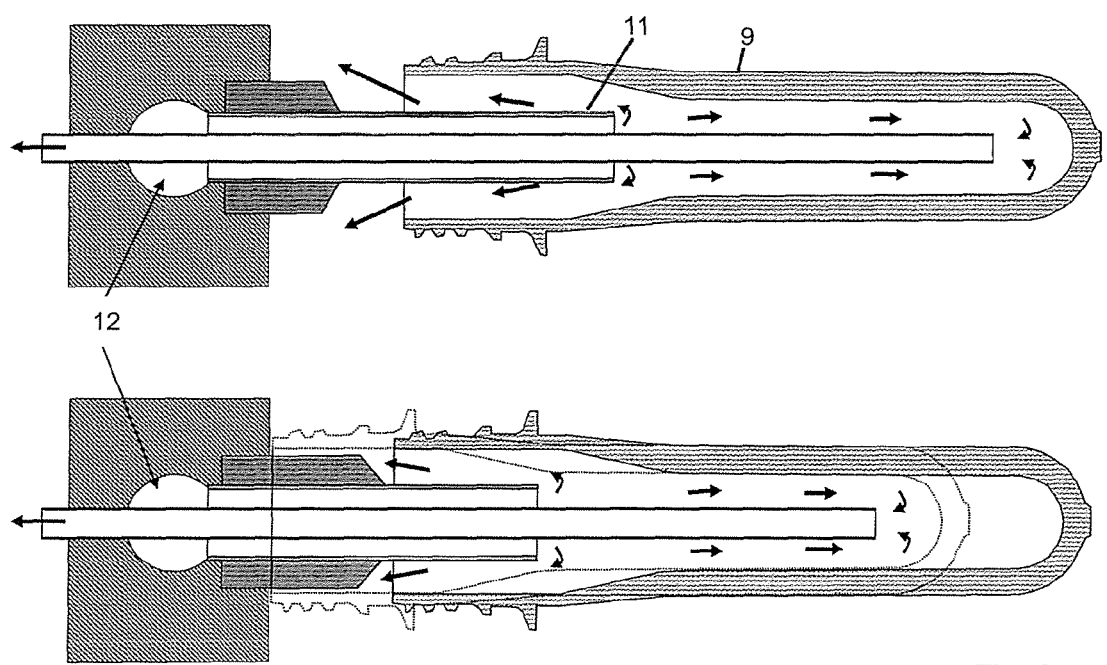
FIG. 8 shows a third embodiment of the invention.

FIG. 8 shows a further alternative embodiment. This differs from the FIG. 7 embodiment only in that the sleeve 11 is of a smaller diameter so that there is an annular space between the sleeve 11 and the preform 9. The result of that is that the air flow divides up when leaving the sleeve 11. A part of the air flows outwardly over the screwthreaded region of the preform 9 while another part of the air flows into the bottom region and there leaves the preform by way of the tip of the pin-shaped passage element.

In the embodiment shown in FIGS. 7 and 8 the sleeve 11 is respectively acted upon with increased pressure. There is therefore no need for the pin-shaped passage element to be connected to a vacuum source at its end towards the pin plate but it can be simply connected to the environment. Alternatively it would also be possible for the end of the pin-shaped passage element, that is at the pin plate side, to be connected to a vacuum or reduced-pressure source, with the sleeve 11 connected to the environment. In that embodiment however dividing up the coolant flow in such a way that a part is discharged from the preform by way of the pin-shaped passage element and another part by way of the preform opening can generally not be implemented.

FIGS. 9 to 12 show a further embodiment of a post-treatment element. Here the sleeve element 11 is in one piece with a holding element 13 which in the direction of the preform has a projection having an inner guide surface 14 and an abutment 15 for the preform. The element 13 has an inner bore 16, into which the pin-shaped passage element 7 is fitted. In addition there is a row of recesses 17 serving for the feed of air. An end view is shown at the right in FIG. 9 for further clarification.

Figure 9:
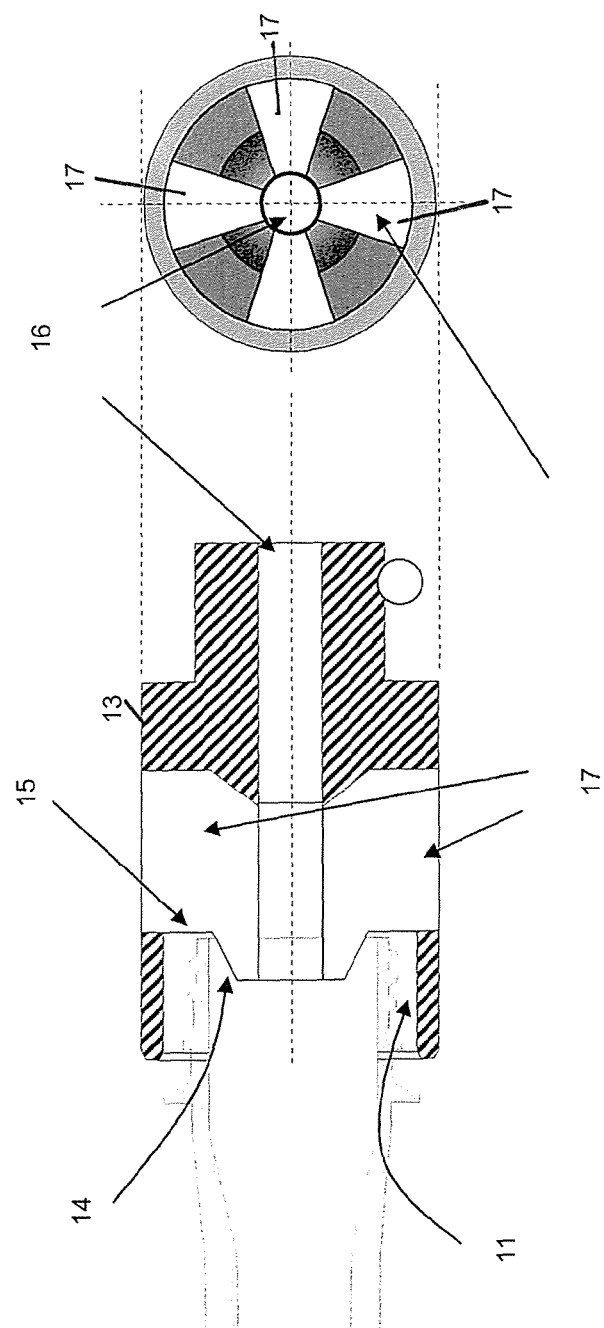
FIG. 9 shows a fourth embodiment of the invention.

FIG. 10 shows the embodiment of FIG. 9 with inserted pin-shaped passage element. In the situation here the preform is held in the receiving element by a corresponding vacuum while, by virtue of the reduced pressure at the end of the pin-shaped passage element 7, that is remote from the receiving element 5, air is sucked through the recesses 17 into the preform and out of the preform by way of the end 18 functioning as the coolant outlet.

In FIG. 11 the receiving element 5 is now acted upon with compressed air while the post-treatment element and the receiving element are moved away from each other. The result of this is that the preform 9 is urged out of the receiving element 5 until it touches the contact surface 15. In that position a suction and vacuum effect by way of the pin-shaped passage element 7 provides that the preform is held on the transfer element.

In the embodiment shown in FIGS. 9 to 12 the post-treatment elements and the transfer element do not differ. Instead, they involve a corresponding dual function. With this embodiment therefore there is no need to provide more post-treatment pins than there are receiving cavities in the removal plate, which not only reduces the costs for manufacture of the post-treatment plate but also reduces the necessary feed flow of coolant as fewer post-treatment pins have to be supplied with coolant.

Figure 13:
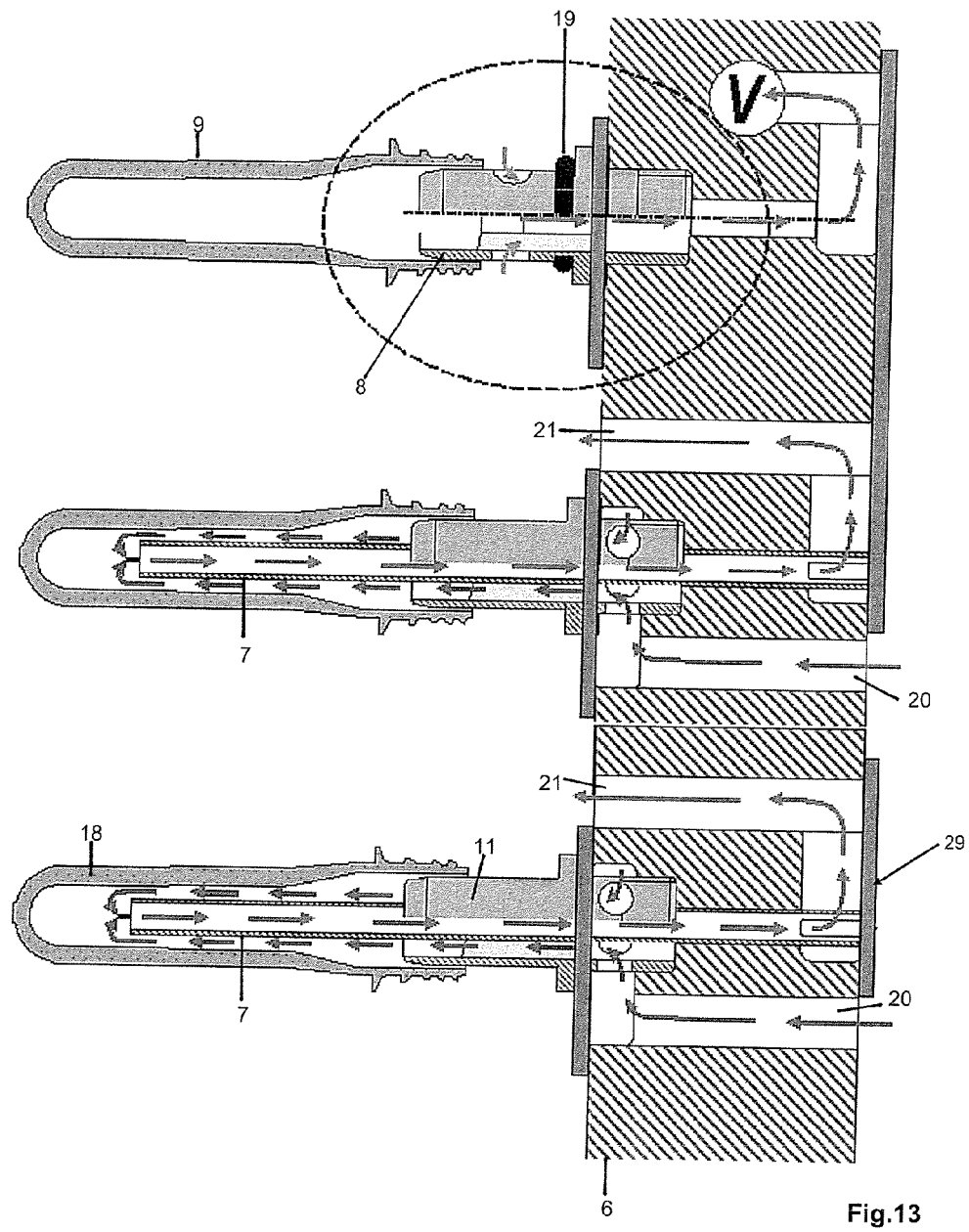
FIG. 13 shows a fifth embodiment of the invention.

FIG. 13 shows a further embodiment. The pin plate 6 has two post-treatment elements (shown at the centre and at the bottom) and a transfer element (shown at the top in the Figure). The transfer element 8 differs from the post-treatment elements in that the pin-shaped passage element is omitted and there is an additional seal 19 which can come into contact with the preform 9 during transfer. In the FIG. 13 embodiment the transfer element is connected to a vacuum source, which makes it possible for the preform 9 to be held on the transfer element 8 when it comes into contact with the seal 19 as a slightly reduced pressure is then produced within the preform 9. The other two pins 7 are provided for post-treatment of the preform 9. Here, air is introduced into the interior of the preform by way of the sleeve 11, by way of a fan (not shown), through the feed means 20. That air flows out of the preform by way of the tip 18 of the pin-shaped passage element and into the environment by way of the passages 21. In that case the air is deflected by way of corresponding deflection plates 29 so that the coolant is fed by way of the rear side of the post-treatment plate (the side thereof that is remote from the pin-shaped post-treatment pins), and is discharged again on the front side.

Figure 14:
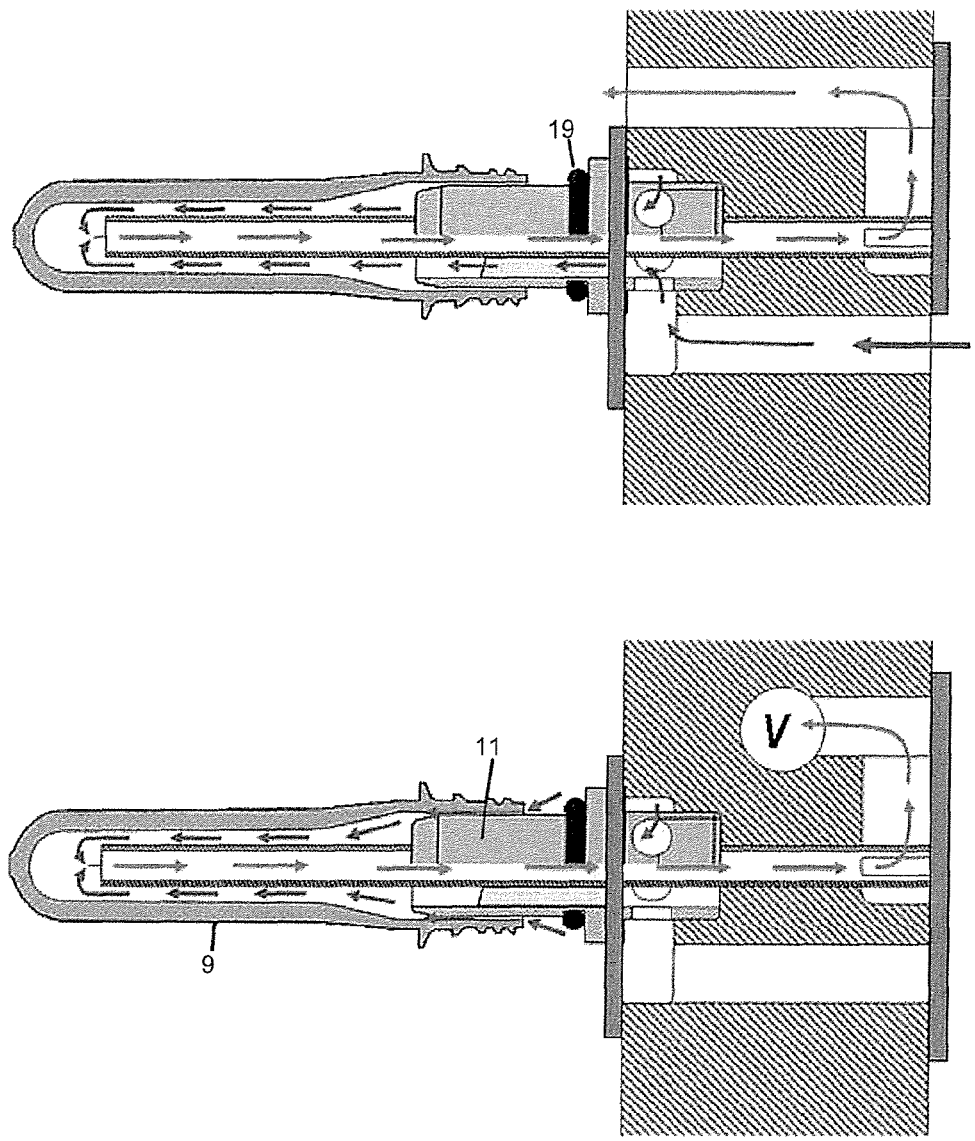
FIG. 14 shows a sixth embodiment of the invention.

FIG. 14 shows a further alternative embodiment of the invention. The post-treatment situation is shown at the top in FIG. 14, functioning as in the FIG. 13 embodiment.

The post-treatment elements however all have a corresponding seal 19, which makes it easier for the pins to be used both for the post-treatment operation and also for the transfer. In principle however the transfer can also be effected without a corresponding seal 19. Although the pins have different functions they are of an identical structure, which reduces the costs of storage, as there is not any need to store both transfer elements and also post-treatment elements.

The transfer situation is shown at the bottom in FIG. 14. Here the sleeve 11 is connected to a vacuum source, which provides that the preform 9 is drawn on to the sleeve 11, thereby permitting transfer of the preform.

Figure 15:
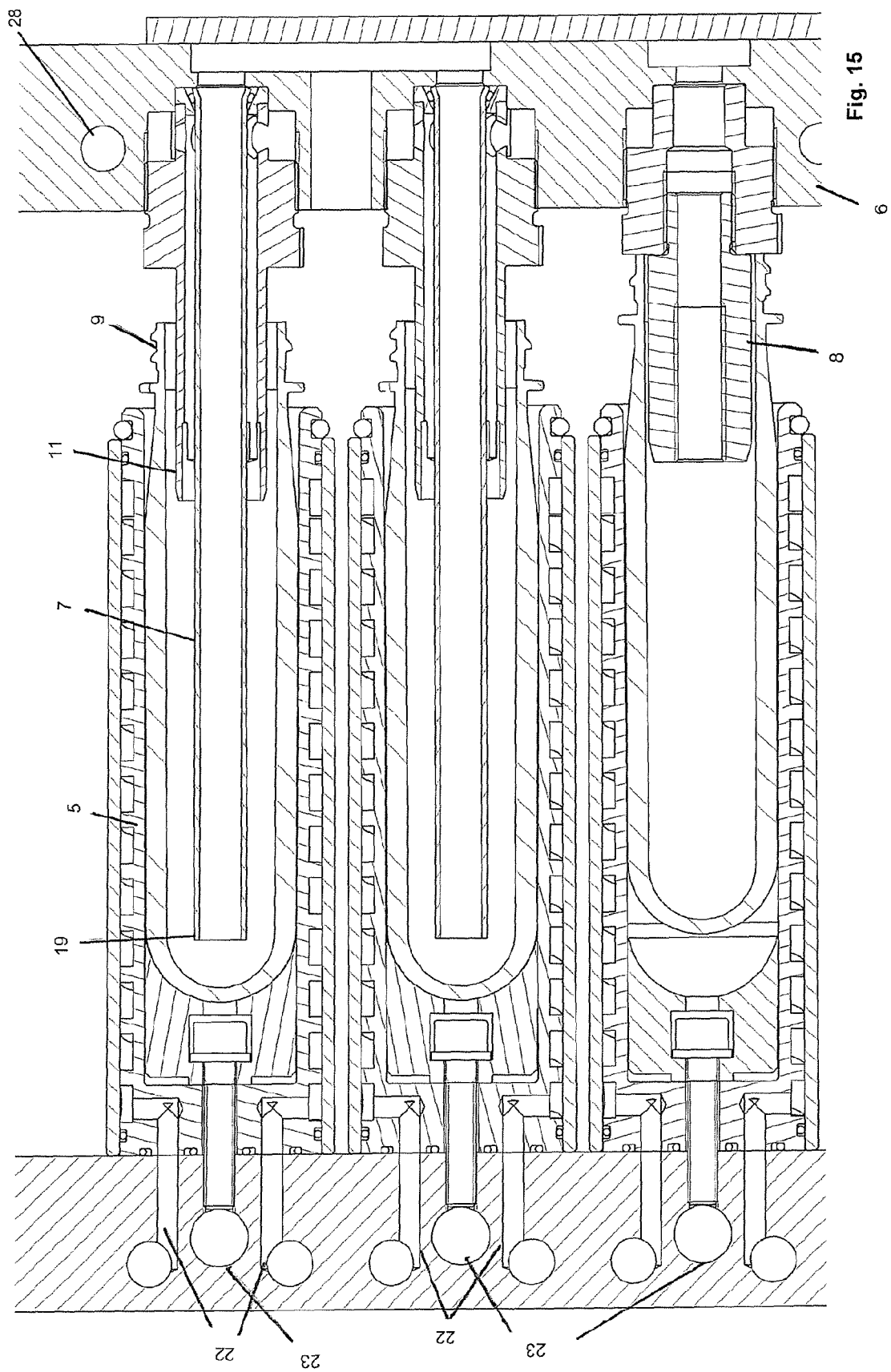
FIG. 15 shows a seventh embodiment of the invention.

FIG. 15 shows a sectional view of a further embodiment. In this case also a transfer element 8 and two post-treatment elements 7 are fixed to the pin plate 6. The FIG. 15 situation also shows the receiving element 5 which is cooled by way of the cooling passages 22, by way of spiral-shaped passages. Compressed air or vacuum can be selectively supplied by way of the feed means 23 at the bottom of the receiving element 5 to either hold the preform 9 within the receiving cavity 5 or expel it therefrom. The pin-shaped passage element 7 is surrounded concentrically by a sleeve 11, by way of which cooling air is passed into the interior of the preform, being discharged by way of the tip 19 of the pin-shaped passage element 7. There are also cooling passages 28, by means of which the post-treatment plate can be cooled, preferably water-cooled.

Figure 16:
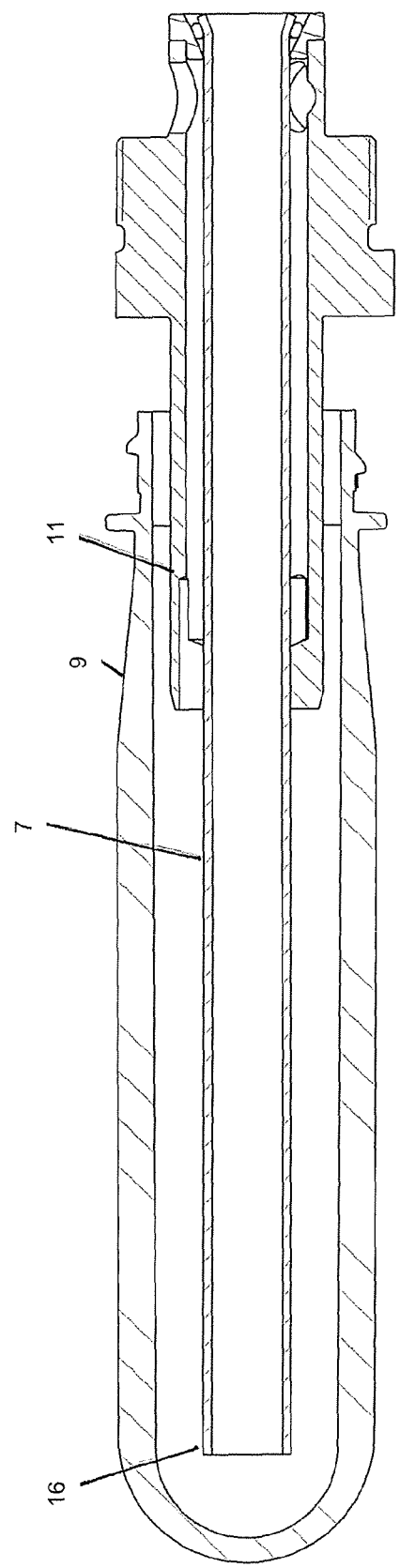
FIG. 16 shows a sectional view of the post-treatment element of the seventh embodiment.

The pin-shaped passage element 7 is shown on an enlarged scale in FIG. 16. It will be seen that in the illustrated situation the cooling air which is fed by way of the sleeve 11 is both passed into the bottom region of the preform 9 in order then to be discharged there by way of the tip of the pin-shaped passage element 7, and it can also leave the preform 9 by way of the preform opening as a gap is arranged between the outside of the sleeve 11 and the inside of the preform 9.

Figure 17:
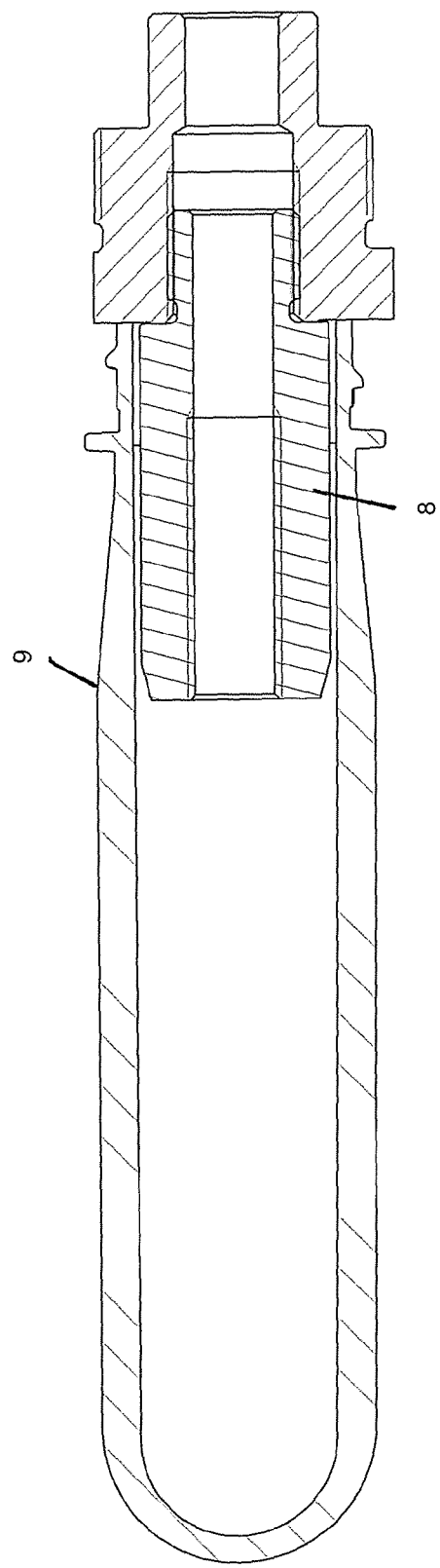
FIG. 17 shows a sectional view of the transfer element of the seventh embodiment.

FIG. 17 shows an enlarged view of the corresponding transfer element 8. That transfer element 8 has a central bore which can be acted upon selectively with vacuum or compressed air to hold or expel the preform 9.

Figure 18:
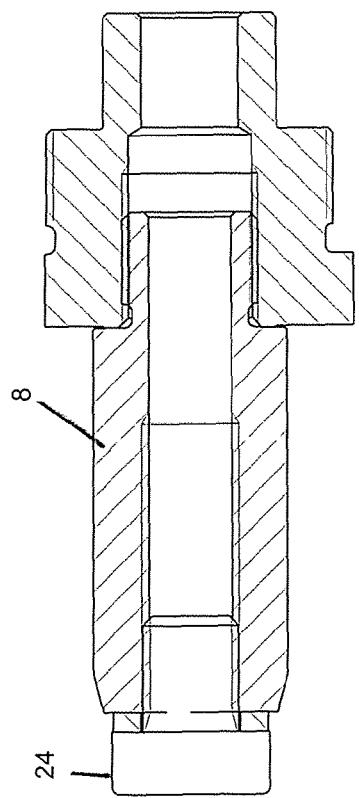
FIG. 18 shows a sectional view of the transfer element of FIG. 17 with closure cap.

FIG. 18 shows a corresponding transfer element 8, a closure cap 24 here being fitted on to the through bore. More specifically, during operation of an injection moulding mould, it can happen that, for some reason, one of the plurality of mould cavities with which the corresponding preforms are produced, can no longer be used. Nonetheless the mould can continue to be used, in which case one preform less is then produced in each injection moulding cycle. As however the post-treatment element generally has a plurality of transfer elements 8 which at the same time are intended to take over preforms from the removal element and are therefore acted upon with compressed air, it is advantageous for all transfer elements 8 to be connected to one and the same vacuum source. If however a corresponding preform is missing at a transfer element, it is not possible for a reduced pressure to be built up there. Instead here air unimpededly flows in so that possibly even in relation to adjacent transfer elements, it is not possible for a sufficiently great reduced pressure to be produced, so that adjacent preforms cannot be transferred. In the case of the transfer element 8 in question therefore a corresponding closure cap 24 is applied to minimise the pressure loss.

Figure 19:
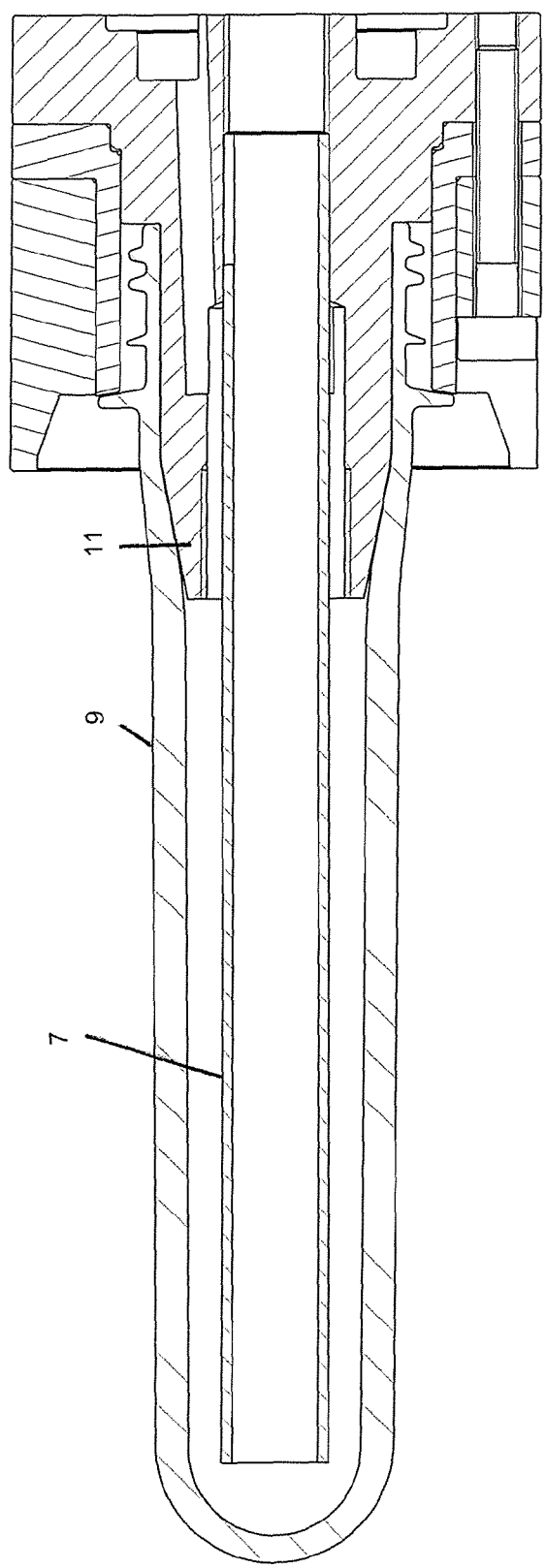
FIG. 19 shows an eighth embodiment of the post-treatment element.

FIG. 19 shows a further embodiment of the invention. That essentially differs from the preceding ones in that the sleeve 11 here is of such a configuration that it substantially corresponds to the inside contour of the preform 9 so that the inside of the preform 9 is in contact with the sleeve 11 in the opening region, that is to say in particular in the region of the screwthread. If the sleeve 11 is additionally cooled then the screwthread region which generally has particularly thick portions and therefore contains a correspondingly large amount of heat can be very effectively cooled down. In addition the complete air flow is then available for the pin-shaped passage element 7.

Figure 20:
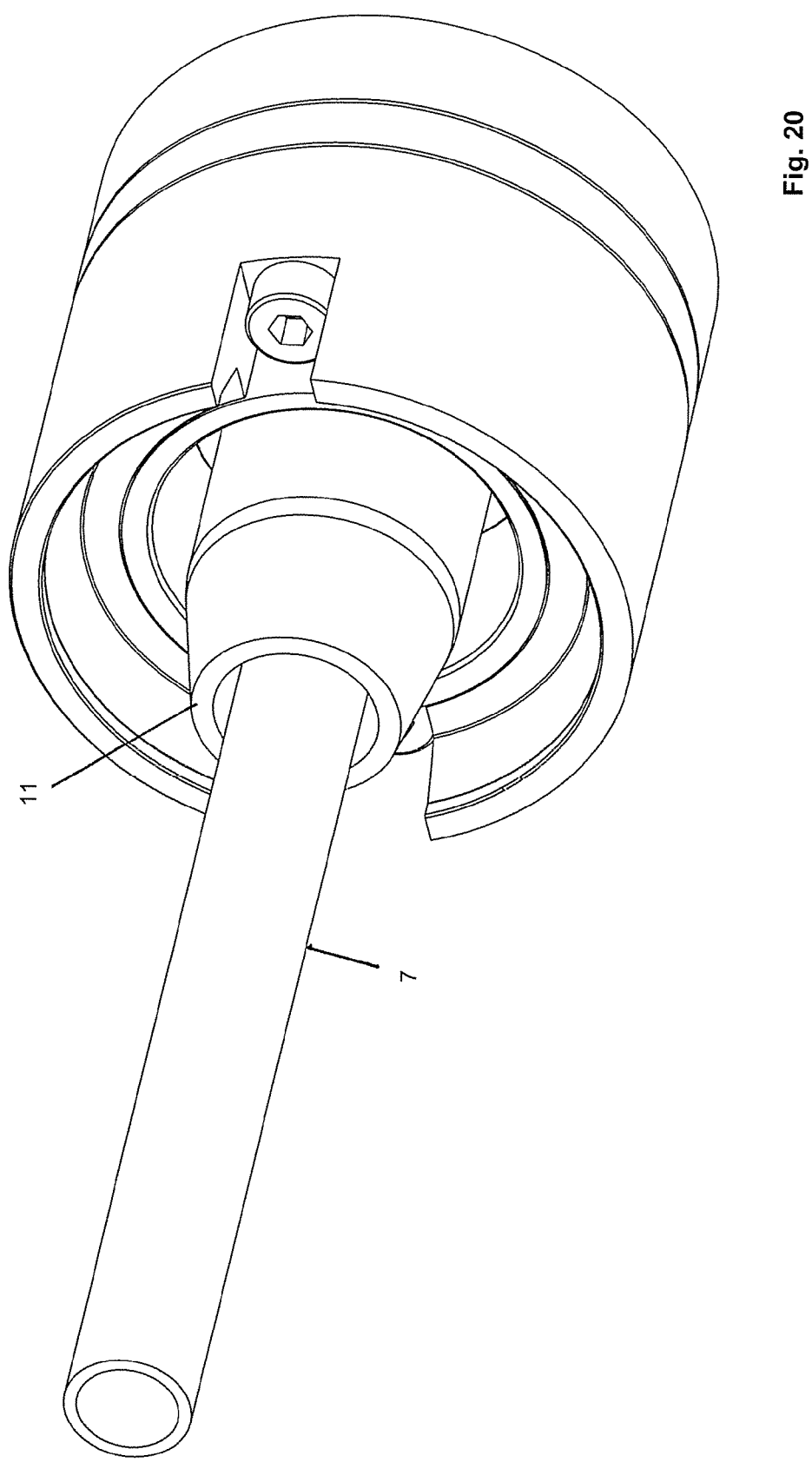
FIG. 20 shows a perspective view of the post-treatment element of FIG. 18.
Figure 21:
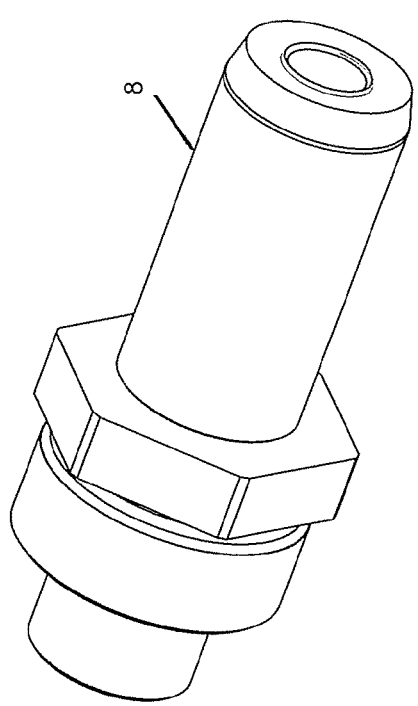
FIG. 21 shows a perspective view of a transfer element.

FIGS. 20 and 21 show perspective views of the post-treatment element (FIG. 20) and the transfer element (FIG. 21) respectively.

Figure 22:
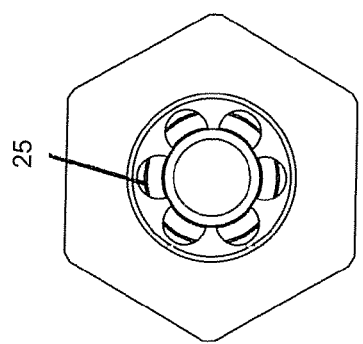
FIGS. 22 and 23 show an end view and a perspective view of the post-treatment pin of the seventh embodiment.
Figure 23:
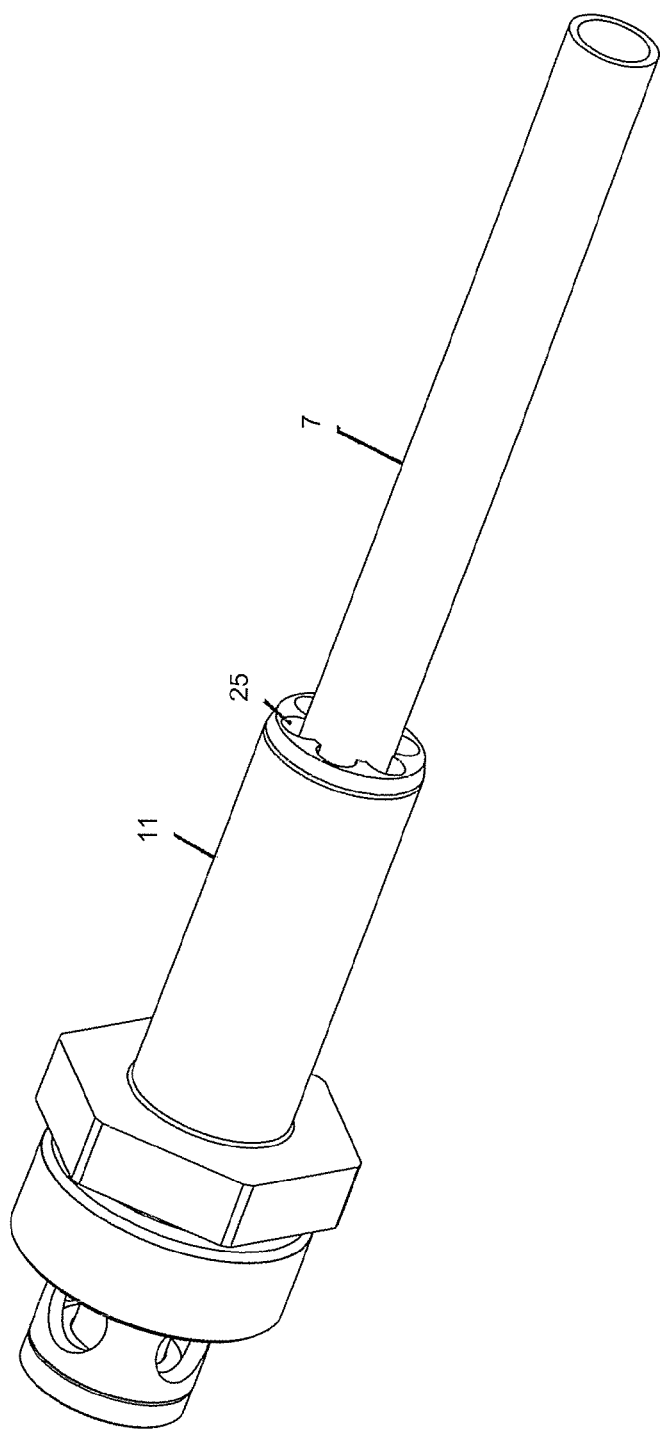

An alternative embodiment of the post-treatment element 7 is shown as a perspective view in FIG. 23 and a plan view from above in FIG. 22. Here the post-treatment element comprises a pin-shaped passage element 7 which is fitted in a sleeve 11 provided with a through bore, with milled grooves 25. The through bore in the sleeve 11 is of a configuration corresponding to the outside diameter of the pin-shaped passage element 7 so that the pin-shaped passage element 7 and the sleeve 11 are in contact. The groove-shaped milled recesses 25 then serve for the feed of air. The configuration according to the invention of the post-treatment system permits inexpensive and at the same time highly effective post-treatment of the preforms.

List of References 1, 2 movable plates
3 cores
4 removal element
5 receiving element
6 post-treatment element, pin plate
7 post-treatment pin, passage element
8 transfer element
9 shaft
9 preform
11 sleeve
12 supply passage
13 holding element
14 guide surface
15 abutment, contact surface
16 inner bore
17 recess
18 end, coolant outlet
19 seal
20 feed means
21 passage
22 cooling passage
23 feed
24 closure cap
25 groove
26 pressure chamber
27 fan
28 cooling passage
29 deflection plate

What is claimed is:

1. A system for the post-treatment of preforms (9) produced by means of injection moulding, comprising
   i) a removal element (4) having:
      a) at least one receiving element (5) for receiving a preform (9), and
      b) a device for moving the removal element (4) between two tool halves of an opened injection moulding mould and for moving the removal element (4) out of the opened injection moulding mould,
   ii) a post-treatment element (6) having
      at least one post-treatment pin (7)
         having a pin-shaped passage element (7),
            of which one end can be connected to the environment or a vacuum or reduced-pressure source and
            of which the other end has an outlet (18) for a coolant, and
   iii) a motion device with which the removal element (4) can be reciprocated relative to the post-treatment element (6) between a first position in which the post-treatment pin (7) is positioned within the receiving element (5) and a second position in which the post-treatment pin (7) is not positioned within the receiving element (5), wherein the removal element (4) and the post-treatment element (6) are so designed that in the first position coolant can be introduced by way of the coolant inlet into a preform (9) held in the receiving element (5) in such a way that it can flow between the inside wall of the preform (9) and the outside wall of the pin-shaped passage element to the coolant outlet (18) and can be discharged by way of the passage element, wherein the post-treatment element (6) has a coolant inlet arranged outside the pin-shaped passage element (7), wherein the coolant inlet is preferably in the form of a sleeve (11) surrounding the pin-shaped passage element (7) so that the coolant can be fed by way of a preferably annular gap formed between the pin-shaped passage element (7) and the sleeve (11), and wherein the sleeve (11) is of such a configuration that coolant can be supplied by way of the sleeve in such a way that a part of the coolant is discharged by way of the coolant outlet (18) and another part is discharged by way of the opening of the preform (9).

2. A system according to claim 1 wherein there is provided a flow machine which provides at the coolant inlet a cooling fluid pressure of between 1 and 3 bars.

3. A system according to claim 1 wherein there is provided a flow machine which provides at the coolant outlet (18) a cooling fluid pressure of less than 1 bar.

4. A system according to claim 1 wherein the post-treatment element (6) has at least one transfer element (8) with which a preform (9) can be transferred from the removal element (4) to the post-treatment element (6).

5. A system according to claim 4 wherein the transfer element (8) has a transfer sleeve (11), wherein the transfer sleeve (11) has a through passage (21) of which the first end can be connected to a vacuum source and the second end ends in the first position within a preform (9) received in the receiving element (5), the second end preferably being arranged at the peripheral surface of the sleeve (11).

6. A system according to claim 4 wherein the transfer element (8) has a compressed air connection, by way of which compressed air can be introduced into the preform (9) received in the receiving element (5) to eject the preform (9) from the transfer element (8).

7. A system according to claim 1 wherein air is used as the coolant.

8. A system according to claim 1 wherein the post-treatment element (6) has a coolant distributor plate including a plurality of post-treatment pins (7).

9. A system according to claim 8 wherein the coolant distributor plate can be rotated about an axis of rotation to eject preforms (9) which were transferred from the removal element (4) on to the coolant distributor plate, wherein preferably the coolant distributor plate can be rotated through about 90°.

10. A system according to claim 8 wherein the flow machine is fixed to the coolant distributor plate and has an intake and an outlet, wherein the intake is connected to the coolant inlet or the coolant outlet of the at least one post-treatment pin (7) while the outlet is connected to a coolant distributor plate opening relative to the environment, or the outlet is connected to the coolant inlet or the coolant outlet of the at least one post-treatment pin (7) while the intake is connected to the coolant distributor plate opening relative to the environment, wherein the coolant distributor plate opening is preferably arranged at the side of the coolant distributor plate, that is opposite to the post-treatment pins (7).

11. A system according to claim 1 wherein the sleeve in the form of the coolant inlet has an outer periphery which approximately corresponds to a portion of the inside contour of the preform to be cooled so that in the first position the outside of the coolant inlet sleeve is in contact with the inside of the preform.

12. A system according to claim 9 wherein the coolant distributor plate has cooling passages for the feed of a coolant for cooling the coolant distributor plate.

13. A system according to claim 1 wherein there is provided a closure cap which can be fitted on to the passage element and/or the coolant inlet and/or the transfer element to close same.

* * * * *